United States Patent
Lammich

(10) Patent No.: US 11,680,437 B2
(45) Date of Patent: Jun. 20, 2023

(54) MOTOR VEHICLE ACCESS CONTROL METHOD AND ACCESS CONTROL SYSTEM

(71) Applicant: U-Shin Deutschland Zugangssysteme GmbH, Erdweg (DE)

(72) Inventor: Marc-Tell Lammich, Erdweg (DE)

(73) Assignee: U-Shin Deutschland Zugangssysteme GmbH, Erdweg (DE)

( * ) Notice: Subject to any disclaimer, the term of this patent is extended or adjusted under 35 U.S.C. 154(b) by 315 days.

(21) Appl. No.: 16/892,460

(22) Filed: Jun. 4, 2020

(65) Prior Publication Data
US 2020/0386036 A1 Dec. 10, 2020

(30) Foreign Application Priority Data
Jun. 4, 2019 (DE) .......................... 102019114917.7

(51) Int. Cl.
| | |
|---|---|
| E05F 15/76 | (2015.01) |
| B60R 25/24 | (2013.01) |
| B60R 25/04 | (2013.01) |
| B60R 25/10 | (2013.01) |
| B60R 25/30 | (2013.01) |
| E05F 15/77 | (2015.01) |

(52) U.S. Cl.
CPC .............. *E05F 15/76* (2015.01); *B60R 25/04* (2013.01); *B60R 25/10* (2013.01); *B60R 25/24* (2013.01); *B60R 25/30* (2013.01); *E05F 15/77* (2015.01); *B60R 2325/105* (2013.01); *B60R 2325/205* (2013.01); *E05Y 2900/531* (2013.01); *E05Y 2900/548* (2013.01); *E05Y 2900/55* (2013.01)

(58) Field of Classification Search
None
See application file for complete search history.

(56) References Cited

U.S. PATENT DOCUMENTS

| 5,929,769 A * | 7/1999 | Garnault ............. B60R 25/2009 340/426.36 |
|---|---|---|
| 6,198,996 B1 | 3/2001 | Berstis |
| 8,335,599 B2 * | 12/2012 | Dickerhoof ............. B60R 25/24 701/2 |
| 9,775,100 B1 | 9/2017 | Smereka et al. |
| 9,873,396 B2 | 1/2018 | Lem et al. |

(Continued)

FOREIGN PATENT DOCUMENTS

| CN | 1951026 A | 4/2007 |
|---|---|---|
| CN | 102001424 A | 4/2011 |

(Continued)

*Primary Examiner* — K. Wong
(74) *Attorney, Agent, or Firm* — Young Basile Hanlon & MacFarlane, P.C.

(57) ABSTRACT

This disclosure relates to an access control method for a motor vehicle. The motor vehicle includes a plurality of access elements, which are automatically moveable between a closed position and an open position. Depending on the at least one detected position of the key element, a prediction is made of which of the plurality of access elements the user is likely to use. This access element is automatically opened. If the prediction turns out to be incorrect, the corresponding one of the plurality of access elements for which the use was originally predicted is returned back from the open position to the closed position. This disclosure further relates to an access control system for a motor vehicle.

9 Claims, 1 Drawing Sheet

(56) References Cited

U.S. PATENT DOCUMENTS

| | | | |
|---|---|---|---|
| 9,972,150 B2* | 5/2018 | Da Deppo | G07C 9/28 |
| 10,101,433 B2 | 10/2018 | Laifenfeld et al. | |
| 10,123,297 B1 | 11/2018 | Harney et al. | |
| 10,328,900 B1* | 6/2019 | Yakovenko | B60R 25/24 |
| 10,415,528 B2 | 9/2019 | Chaplow et al. | |
| 2002/0084887 A1 | 7/2002 | Arshad et al. | |
| 2002/0118579 A1 | 8/2002 | Lucy et al. | |
| 2004/0021550 A1 | 2/2004 | Ohtaki et al. | |
| 2010/0075656 A1 | 3/2010 | Howarter et al. | |
| 2010/0305779 A1 | 12/2010 | Hassan et al. | |
| 2011/0316669 A1 | 12/2011 | McBride et al. | |
| 2013/0030645 A1 | 1/2013 | Divine et al. | |
| 2015/0070135 A1 | 3/2015 | Ford | |
| 2015/0102898 A1 | 4/2015 | Huennekens et al. | |
| 2015/0120151 A1 | 4/2015 | Akay et al. | |
| 2015/0149042 A1 | 5/2015 | Cooper et al. | |
| 2015/0363988 A1 | 12/2015 | Van Wiemeersch et al. | |
| 2016/0159321 A1 | 6/2016 | Lagabe | |
| 2016/0272154 A1 | 9/2016 | Sanji et al. | |
| 2016/0320469 A1 | 11/2016 | Laifenfeld et al. | |
| 2017/0016266 A1 | 1/2017 | Van Wiemeersch et al. | |
| 2017/0318612 A1 | 11/2017 | Gu et al. | |
| 2018/0002972 A1 | 1/2018 | Myers et al. | |
| 2018/0053416 A1 | 2/2018 | Sanji et al. | |
| 2018/0068510 A1 | 3/2018 | Atsumi | |
| 2018/0265039 A1 | 9/2018 | Jain et al. | |
| 2019/0003439 A1 | 1/2019 | Chaplow et al. | |
| 2019/0126843 A1 | 5/2019 | Bouchard et al. | |
| 2019/0130682 A1 | 5/2019 | Farges | |
| 2019/0300006 A1* | 10/2019 | Golsch | G07C 9/00309 |
| 2019/0304224 A1* | 10/2019 | Golsch | G07C 9/00309 |
| 2019/0393618 A1 | 12/2019 | Guthrie et al. | |
| 2020/0169842 A1 | 5/2020 | Yamaguchi | |
| 2020/0196094 A1 | 6/2020 | Smith | |
| 2020/0196095 A1 | 6/2020 | Smith et al. | |
| 2020/0297059 A1 | 9/2020 | Viner et al. | |
| 2020/0384952 A1 | 12/2020 | Lammich | |
| 2021/0046888 A1 | 2/2021 | Vardharajan | |
| 2021/0074093 A1 | 3/2021 | Love et al. | |
| 2021/0188212 A1 | 6/2021 | Lammich | |
| 2021/0270956 A1 | 9/2021 | Yoshida et al. | |

FOREIGN PATENT DOCUMENTS

| | | | |
|---|---|---|---|
| CN | 102419431 A | 4/2012 | |
| CN | 102602363 A | 7/2012 | |
| CN | 102611471 A | 7/2012 | |
| CN | 103946899 A | 7/2014 | |
| CN | 105093171 A | 11/2015 | |
| CN | 107128282 A | 9/2017 | |
| CN | 107454552 A | 12/2017 | |
| CN | 107963059 A | 4/2018 | |
| CN | 108307294 A | 7/2018 | |
| CN | 109218972 A | 1/2019 | |
| CN | 109466506 A | 3/2019 | |
| CN | 110239485 A | 9/2019 | |
| DE | 69913607 T2 | 9/2004 | |
| DE | 102007002700 A1 | 7/2008 | |
| DE | 10306610 C5 | 12/2008 | |
| DE | 102007010583 B4 | 5/2010 | |
| DE | 102010010057 A1 | 9/2011 | |
| DE | 102011103406 A1 | 12/2012 | |
| DE | 102013112120 A1 | 5/2015 | |
| DE | 102015106680 A1 | 11/2015 | |
| DE | 102014010343 A1 | 1/2016 | |
| DE | 102014115250 A1 | 4/2016 | |
| DE | 102016108725 A1 | 11/2016 | |
| DE | 102015214793 A1 | 2/2017 | |
| DE | 102016115754 A1 | 3/2017 | |
| DE | 102017200257 A1 | 7/2017 | |
| DE | 102017105629 A1 | 9/2017 | |
| DE | 102017213814 A1 | 2/2019 | |
| DE | 102019114912 B3 | 2/2020 | |
| FR | 2934223 A3 | 1/2010 | |
| GB | 2572584 B | 9/2022 | |
| JP | 2004183625 A | 7/2004 | |
| JP | 2004232558 A | 8/2004 | |
| JP | 2005315024 A | 11/2005 | |
| JP | 2006009650 A | 1/2006 | |
| JP | 2006298169 A | 11/2006 | |
| JP | 2007063893 A | 3/2007 | |
| JP | 2007238025 A | 9/2007 | |
| JP | 2008227789 A | 9/2008 | |
| JP | 2008285885 A | 11/2008 | |
| JP | 2008285946 A | 11/2008 | |
| JP | 2009029376 A | 2/2009 | |
| JP | 2009046837 A | 3/2009 | |
| JP | 2009286343 A | 12/2009 | |
| JP | 2010146095 A | 7/2010 | |
| JP | 2010157794 A | 7/2010 | |
| JP | 2011144624 A | 7/2011 | |
| JP | 2011184918 A | 9/2011 | |
| JP | 2012007971 A | 1/2012 | |
| JP | 2012172367 A | 9/2012 | |
| JP | 2015045183 A | 3/2015 | |
| JP | 2015063827 A | 4/2015 | |
| JP | 2015085899 A | 5/2015 | |
| JP | 2015151792 A | 8/2015 | |
| JP | 2015209715 A | 11/2015 | |
| JP | 2016014259 A | 1/2016 | |
| JP | 2016030919 A | 3/2016 | |
| JP | 2016183489 A | 10/2016 | |
| JP | 2016188499 A | 11/2016 | |
| JP | 2018034635 A | 3/2018 | |
| JP | 2018141771 A | 9/2018 | |
| JP | 2018145615 A | 9/2018 | |
| JP | 2018178506 A | 11/2018 | |
| JP | 2019032169 A | 2/2019 | |
| KR | 20150011032 A | 1/2015 | |
| WO | 2016194997 A1 | 12/2016 | |
| WO | 2017136725 A1 | 8/2017 | |
| WO | 2019048266 A1 | 3/2019 | |
| WO | 2019097051 A1 | 5/2019 | |

* cited by examiner

MOTOR VEHICLE ACCESS CONTROL METHOD AND ACCESS CONTROL SYSTEM

CROSS-REFERENCE TO RELATED APPLICATION(S)

This application claims priority to and benefit of German Application No. DE102019114917.7 filed on Jun. 4, 2019, the entire disclosure of which is incorporated by reference.

TECHNICAL FIELD

The present invention relates to an access control method for a motor vehicle. Furthermore, the present invention relates to an access control system.

STATE OF THE ART

For reasons of comfort, modern motor vehicles are increasingly fitted with automatically opening door systems. For this purpose, an owner receives a portable key element whose position can be detected by the vehicle. In response to certain detected positions, a door can then automatically be unlocked and/or opened by the vehicle. Thus a person carrying the key element does not have to take it into his hands and/or operate it, for example by pressing a button, before access to the vehicle can be gained. This makes access to the motor vehicle particularly convenient.

FR 2934223 describes a predictive access control for a motor vehicle. This predictive access control not only takes into account the position of a transponder for controlling a door opening, but also a path of movement of this transponder.

A prediction enables a particularly early door opening, which can further increase convenience. A prediction can, however, always be subject to errors. As a result, a door can undesirably be opened, which then should not or is not used at all. This can lead to uncomfortable situations for the respective users of the motor vehicle.

DESCRIPTION OF THE INVENTION

The object of the present invention is to improve the convenience of access control for motor vehicles in which the respective access elements are automatically opened.

This object is solved by the subject-matter of the independent claims. Advantageous embodiments and expedient further developments of the invention are indicated in the respective dependent claims.

A first aspect of the invention relates to an access control method for a motor vehicle. The motor vehicle may have a plurality of access elements which are automatically moveable between a closed position and an open position. Access elements can be, for example, respective doors, respective windows and/or a boot lid of the motor vehicle, wherein respective doors and the boot lid are preferred access elements. In their respective closed positions, the access elements can, for example, almost completely close off respective access openings to the motor vehicle. In their respective open positions, the access elements can, for example, at least partially unblock respective access openings to the motor vehicle. In the open position, the respective access opening is preferably unblocked by a respective access element to such an extent that a person can enter the interior of the motor vehicle or respectively use the boot. Each access element in the open position can also be referred to as an opened access element and each access element in the closed position as a closed access element. Accordingly, moving them to the open position can be described as opening and moving them to the closed position as closing. Additionally or alternatively, locking and unlocking can be carried out during or as opening or closing.

The method may include detecting by wireless transmission at least one position of a key element carried by a user relative to the motor vehicle. Such detection can be carried out, for example, by triangulation with several transmitters and/or receivers on the motor vehicle. Several wireless transmission signals on different frequencies can also be used for detection. For example, a wireless transmission signal with low energy consumption and long range can first be emitted from the key element and/or the motor vehicle. As soon as the key element is within range of a wireless transmission link, a transmission is then activated on a frequency that enables particularly accurate positioning. Each wireless transmission signal may be encrypted and/or have a unique identifier to reduce the risk of unauthorized access and/or to ensure authorization of the key element for gaining access to the vehicle.

A portable key element can be a device that can be carried by a user or carrier. A carried key element does not necessarily mean that the key element is held. The key element may be considered as carried when it moves with the user or carrier, especially when the user or carrier is walking. For example, the key element may also be carried in a handbag, carried in a trouser pocket, worn as a garment and/or also be implanted in the user.

Furthermore, the method may include predicting which of the plurality of access elements will likely be used by the user depending on the at least one detected position of the key element. The prediction can thus serve to predict which of the access elements the carrier of the key element probably intends to use. A probable use can especially be predicted if a probability of use is above a predetermined threshold. The probability of use can be calculated depending on the detected position of the key element. A plurality of detected positions, in particular of successive detected positions in time, and/or certain values indirectly determined in dependence on the respective detected positions, such as a path of movement, a direction of movement and/or a speed of movement, can also be taken into account. A simple example of a prediction is an extrapolation of the current movement and checking whether it intersects or points to one of the access elements.

The method may also involve moving the corresponding one of the plurality of access elements for which use has been predicted from its closed position to its open position. This opens, for example, the door for which use is assumed to be desired by the carrier of the key element. This allows the carrier of the key element or the user to gain access to the motor vehicle in a particularly simple and convenient manner. The respective access elements can be moved automatically, for example by means of an actuator installed in the vehicle which interacts with one or more access elements. For example, an electric motor can be provided per vehicle door, by means of which the associated vehicle door can be swiveled between its respective positions and/or unlocked. Unlocking can involve releasing a lock to adjust the access element, such as opening a door lock.

The movement may in particular involve a pivoting movement about a pivot axis in the case of a vehicle door, lifting and lowering in the case of a boot lid and/or moving up and down in the case of a window, for example by means of an electric window lifter. Furthermore, the method may include a determination of whether the prediction for the use of the access element was incorrect. It can therefore be checked whether the prediction was correct or true, or whether it was wrong or incorrect. This check can be carried out continuously or only after the corresponding one of the plurality of access elements for which the use was predicted has been moved in its open position. In case of an incorrect prediction, a situation can occur in which one of the access elements has been moved to the open position, but its use is not desired or planned. The prediction may also be incorrect if the user changes his usage plans and adjusts his movements accordingly. In this case, for example, a door of the car may stand open without the user going to use it. This can be uncomfortable for the user, as he or she may then have to arrange for closure of this access element, for example, by closing it manually. Determining whether a prediction was incorrect can also involve a detection, for example a detection of a non-use of an open access element.

The method may involve returning of the corresponding one of the plurality of access elements for which use was originally predicted from its open position to its closed position if the prediction for its use was incorrect. This avoids an uncomfortable situation for respective users even if an access element is opened erroneously. It may therefore be necessary to return the access element, which was moved to its open position according to the prediction, back to its closed position. In addition or as an alternative to returning back into the closed position, the respective access element can also be locked again.

The erroneous prediction can be stored, especially in a database. By means of this stored data the accuracy of future predictions can be improved. The data or erroneous predictions can be assigned to a certain key element in a plurality of key elements and/or certain users in order to create and/or extend respective user profiles.

The method can also be carried out for several different key elements, especially simultaneously. For example, a position of a first key element and a position of a second key element can be detected and, depending on this, a prediction for the use of a respective access element can be made in each case. For example, when the first key element or a first user approaches a driver's door, its use can be predicted and the driver's door can be moved accordingly. At the same time, when the second key element or a second user approaches a passenger door, its use can be predicted and the passenger door can be moved accordingly. Accordingly, it is also possible to determine for both predictions whether they were incorrect in each case and then, in the event of an incorrect prediction, the corresponding access element, for example the driver's door and/or the passenger door, can be closed again.

In another advantageous embodiment of the method, it is provided that several consecutive positions of the key element are detected and that the several consecutive positions of the key element are taken into account when predicting which of the plurality of access elements the user is likely to use. The accuracy of the prediction can be improved by detecting several consecutive positions. Successive can be understood in terms of space and/or time. In particular, such a detection not only allows the current position of the key element relative to the motor vehicle to be taken into account, but also previous positions, a speed of movement, a direction of movement, a pattern of movement and/or a past path of movement. The determination and/or use of these data or values for the prediction can further improve its accuracy.

Alternatively or additionally, another advantageous embodiment of the method is provided to take into account a motor vehicle environment, in particular, for example, obstacles such as walls and/or other motor vehicles, when predicting which of the plurality of access elements the user intends to use. The environment can be detected with respective sensors, for example an ultrasonic sensor and/or a camera. The obstacles can also be detected by respective propagations of wireless transmission waves between respective key elements and the detection device. Thus, respective boundary conditions which restrict a movement of the carrier of the key element can be taken into account for the prediction. The prediction is thus more accurate, especially in connection with the consideration of the above described detection of several successive positions. For example, the prediction can thus take into account that the user essentially walks the shortest path to the driver's door and, for example, only had to avoid a pillar. This evasion is then no or only a weak indication that the user is more likely wanting to use a back door instead of a front door. The consideration of boundary conditions is particularly easy to integrate in a prediction with probability determination for the likely use of respective access elements.

In another advantageous embodiment of the method, it is provided that a stored user behavior is also taken into account when predicting which of the plurality of access elements the user will likely use. The prediction is thus also made, for example, in dependence on a stored user behavior. This user behavior can, for example, relate to the frequency of use of certain access elements and/or be assigned to respective users and/or certain key elements. For example, a stored user behavior can indicate that a certain user enters almost exclusively at the driver's door and another user with a different key element usually at the passenger door. This can be taken into account to improve the prediction, especially when determining a probability of which access element is likely to be used by a particular user. For example, the user behavior may be stored in a database device. In particular, the user behavior can be stored as respective previous predictions and the determination of whether these predictions were incorrect and/or correct. In this way a self-learning system and/or method can be implemented. For example, the user behavior can include or store recorded positions and then actually used access elements. A correlation can thus be determined that is taken into account in the prediction.

In another advantageous embodiment of the method, it is provided that the determination of whether the prediction for the use of the access element was incorrect will depend on a trigger signal. This trigger signal can be an external signal and/or an additional detection of a signal independent of the prediction. Thus, the determination of whether the prediction was incorrect can be particularly reliable or even unambiguous. In this way, it is also possible to take into account conditions of the motor vehicle and/or boundary conditions in which it is essential that the respective access element opened on the basis of the prediction is closed again. In this way, for example, potentially dangerous situations can be avoided.

In a further advantageous configuration of the method, it is provided that the trigger signal is a starting of the engine, an opening of another of the plurality of access elements, other than the access element for which the use was predicted, a vehicle speed above a predetermined threshold and/or an actuation of a lock of the motor vehicle. When the engine has been started, the access element should be closed to prevent damage to the access element by a driving movement. This also reliably prevents a user from getting into a vehicle that could start moving at any time. Such a potentially dangerous situation can thus be avoided. The same applies for the consideration of exceeding a threshold value of the vehicle speed. Taking into account the actuation of the vehicle lock as a trigger signal makes it possible to manually suppress the automatic opening—for example, if the access element is still moved at the time of actuation—and/or to manually trigger a return to the closed position. In this way, for example, a person already inside the vehicle can prevent another user from unwantedly entering the vehicle. The opening of another of the plurality of access elements can be a very reliable indication that the prediction was incorrect, so that its consideration is also useful.

In another advantageous embodiment of the method, it is provided that the determination of whether the prediction for the use of the access element was incorrect is done by making a further prediction of which of the plurality of access elements the user is likely to use, wherein the result of this prediction differs from the original prediction. For example, if the position of the key element relative to the motor vehicle changes and/or if it deviates from a predicted movement of the user or the key element carried by the user, the prediction can be updated. If the updated prediction indicates that another of the plurality of access elements is expected to be used, the original prediction can be classified as incorrect and the corresponding access element can be reclosed. In particular, the result of the prediction can be considered as different if, compared to the original prediction, the access element with the highest probability of use has changed. On the other hand, a changed use probability of the respective access elements can still be regarded as a prediction with the same result, if the use of the same access element is nevertheless predicted as most likely. The further prediction can be taken into account alternatively or additionally to the trigger signal to determine whether a prediction was incorrect. The further prediction can be made depending on further detection of the position of the key element. In particular, a respective prediction can be carried out continuously or quasi-continuously in order to close the access element for which the expected use is no longer predicted if the prediction result changes. The quasi-continuous prediction can be carried out at predetermined time intervals, for example five times per second when a key element is within detection range for position determination. For the continuous or quasi-continuous prediction, respective positions of the key elements can be detected continuously or quasi-continuously, especially according to the frequency of the prediction.

A second aspect of the invention relates to an access control system for a motor vehicle. The access control system according to the second aspect may be adapted to be operated and/or controlled by a method according to the first aspect. The features and advantages resulting from the method according to the first aspect are to be taken from the description of the first aspect, wherein advantageous embodiments of the first aspect are considered to be advantageous embodiments of the second aspect and vice versa.

The access control system may comprise a movement device for automatically moving a plurality of access elements of the motor vehicle, such as respective doors, respective windows and/or a boot lid, between their respective open and respective closed positions. For this purpose, the movement device may comprise respective actuators and/or control units. In particular, the movement device may be configured for an operative connection with the access elements for their movement, in particular by being able to articulate the access elements for their movement. Alternatively or additionally, the movement device can also be configured to unlock and/or lock the respective access elements. In particular, the movement device may be configured to lock and/or unlock respective door locks.

The access control system may include at least one portable key element. Thus, remote control and/or automatic movement of respective access elements may be provided, such that access to the motor vehicle can be particularly convenient for respective users. The access control system may also include the motor vehicle and/or be partially arranged with its components on the motor vehicle. A plurality of key elements may also be provided, each of which, for example, is associated with the access control system and/or is assigned to individual users. The key elements may be distinguishable from one another for this purpose, in particular by means of wireless transmission and/or a specific key identifier.

The access control system may include at least one detection device configured to detect by wireless transmission at least one position of the key element relative to the motor vehicle. The position detection can cause an automatic movement of respective access elements without the user having to actuate anything, such as a button on the key element. Detection by wireless transmission is simple, reliable and allows position determination without direct contact of the key element with the vehicle and/or a line of sight between the vehicle and the key element. Thus, comfort is particular high.

The access control system may include at least one prediction device which is configured to predict which of the plurality of access elements a carrier of the key element is likely to use depending on the at least one detected position of the key element. The use of one of the plurality of access elements is predicted in particular if a probability of use is above a predetermined threshold value. The prediction allows a selection of an access element to be made, which is then automatically opened for the user in anticipation. This makes access to the vehicle particularly convenient for the user. In particular, the respective access element can be moved so early that it is already sufficiently opened for access to the vehicle before the user reaches the corresponding access opening or access element.

This avoids the user having to wait for automatic unblocking of access to the motor vehicle. The carrier of the key element may be a user of the access control system or a person using access to the motor vehicle. The prediction device may also be configured to determine whether the prediction was incorrect.

The movement device may be configured to move that one of the plurality of access elements for which use has been predicted from its closed position to its open position. For this purpose, the respective access elements and the movement device may be operatively connected with each other.

The movement device may be configured to return the one of the plurality of access elements for which the use was originally predicted from its open position back to its closed position in case of an incorrect prediction. In this way, an access element that was opened by mistake due to an incorrect prediction can be automatically closed again without any action by the user being necessary. In particular, this avoids the need for manual closing of doors due to automatic opening if not being used for access by the respective user.

The movement device is preferably arranged or installed in the motor vehicle. The detection device may preferably be at least partially installed in the motor vehicle. The detection device may be configured to distinguish between a plurality of key elements and to determine or calculate their position relative to the motor vehicle individually. A respective position calculation may also be performed by the respective key elements and/or a central server. The prediction device can be implemented in the motor vehicle, in the respective key element and/or on a central server.

In another advantageous embodiment of the access control system it is provided that the key element is configured as a wireless transmission key, smartphone, smartwatch, key card, RFID chip and/or remote control. In particular, a smartphone and a smartwatch are advantageous as a key element, as most people already own such a device and carry it with them permanently. Thus, there is no need for an additional device. Moreover, such devices often already have the necessary wireless transmission technology to determine the position by means of the detection device. Furthermore, such devices often already have the computing power to implement parts of the access control system, such as the prediction device, on them. Thus, no separate computing power needs to be provided, which can make the access control system particularly cost-effective.

Advantageously, the detection device may have one or more transmitters and the key element may have corresponding receivers. Alternatively or additionally, the detection device can have one or more receivers and the key element can have corresponding transmitters. If the transmitter is provided on the detection device or on the motor vehicle, the key element can be particularly simple and inexpensive. If the transmitter is provided on the key element, the motor vehicle or the detection device can be inexpensive, in particular if the smartphone and/or the smartwatch is used as the key element. If both transmitters and receivers are fitted to the detection device or vehicle, the system is adaptable to work with a wide variety of key elements. If transmitters and receivers are provided on the key element and on the detection device or the motor vehicle, data can be exchanged, for example for authentication and/or unique identification of the respective key element. The multiple transmitters or receivers allow simple triangulation for position determination. For example, with the new Bluetooth Low Energy Standard 5.1, however, even a single transmitter and single receiver can already allow distance and direction determination to each other and thus position determination relative to the motor vehicle, which means that the costs with individual transmitters and/or receivers can be low. In particular, correspondingly can be defined such that the respective transmitters and receivers are configured for the use of the same wireless transmission frequency and/or the same wireless transmission standard.

The use of different signals may also be provided. For example, a signal with low energy consumption can be transmitted continuously or quasi-continuously to wake up a corresponding receiver/transmitter. For example, this allows another transmitter/receiver to be activated on reception, whose signal allows better position detection, but has a higher energy consumption. The respective wireless transmission signals can be used by the detection device to triangulate the position of the key element to respective transmitters/receivers of the detection device.

In another advantageous embodiment of the access control system, it is provided that the access control system comprises a sensor device which is configured to determine whether the prediction was incorrect, in particular on the basis of a detection of a trigger signal. The trigger signal may, for example, be generated by respective components of the motor vehicle. The sensor device can also generate the trigger signal itself by means of respective sensors and then transmit it to the prediction device and/or the movement device. The sensor device may comprise one or more sensors. Each sensor is preferably part of the motor vehicle or installed on it. The sensor device may also be configured to be connected to respective sensors of the motor vehicle. The respective sensors can, for example, be configured to detect a driving state of the motor vehicle, in particular its speed, a starting of the engine, a state of a lock, an opening of respective access elements and/or a manual actuation of a lock. The sensor device can thus be configured to generate a trigger signal to indicate the movement device that the prediction was incorrect. For example, the sensor device may be configured to detect use of respective access elements, starting of an engine of the motor vehicle, exceeding of a predetermined minimum vehicle speed and/or actuation of a lock and to generate or detect the trigger signal in dependence thereon. Alternatively, the prediction device can also generate a trigger signal in the event of a changed prediction, depending on which the access element incorrectly moved into the open position is then automatically closed again by the movement device.

In a further advantageous embodiment of the access control system, it is provided that the prediction device is configured to determine whether the original prediction for the use of the one of the plurality of access elements was incorrect by making a further prediction which of the plurality of access elements the carrier of the key element is likely to use by means of the prediction device, wherein the result of this prediction differ from the original prediction. This further prediction can be made in particular depending on further detected positions.

A further aspect of the invention relates to a motor vehicle comprising a plurality of access elements, such as respective doors, respective windows and/or a boot lid, which are automatically moveable between a closed position and an open position, as well as all with parts of the access control system not implemented in the key element and/or on a central server, preferably with the detection device, the movement device and the prediction device. Access control to the motor vehicle according to the further aspect can preferably be controlled by means of the method according to the first aspect. The features and advantages resulting from the method according to the first aspect and the system according to the second aspect are to be taken from the descriptions of the first and second aspect, respectively, wherein advantageous embodiments of the first and second aspect are to be regarded as advantageous embodiments of the further aspect and vice versa.

Further features of the invention result from the claims, the exemplary embodiments and the drawings. The features and combinations of features mentioned above in the description as well as the features and combinations of features mentioned subsequently for the embodiments can be used not only in the combination indicated in each case but also in other combinations without leaving the scope of the invention.

DETAILED DESCRIPTION OF EMBODIMENTS

Figure 1:
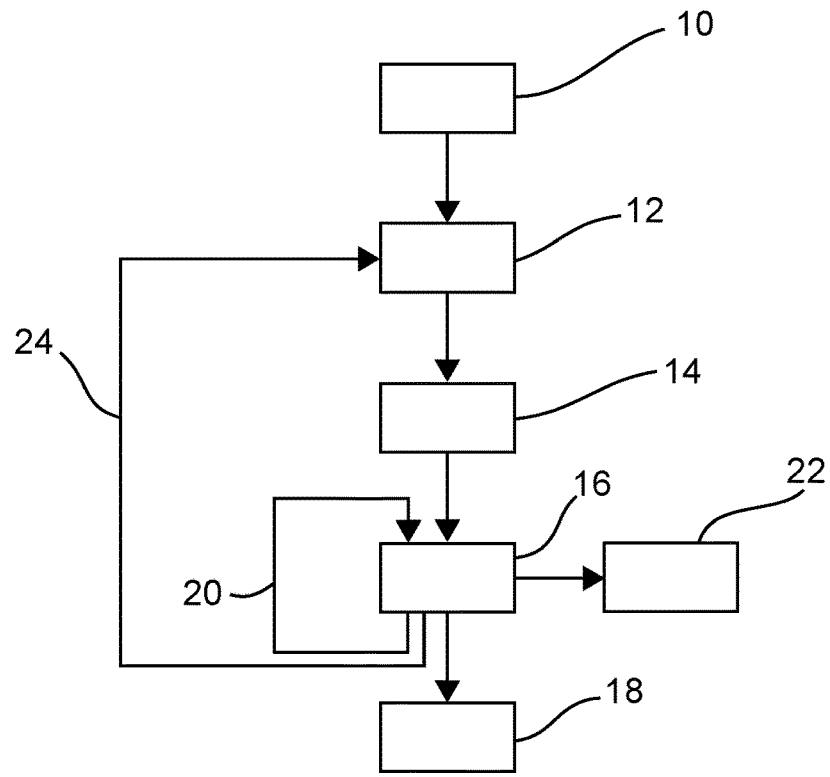
FIG. 1 illustrates in a flow chart a method for access control for a motor vehicle.

FIG. 1 illustrates in a flow chart a method for access control for a motor vehicle. The method can be used to control access to the motor vehicle with a plurality of access elements of the motor vehicle, such as respective doors, respective windows and/or a boot lid, which can be automatically adjusted between a closed position and an open position.

The method starts with step 10, in which at least one position of a key element carried by a user relative to the motor vehicle is detected by wireless transmission. In the subsequent step 12, a prediction is made as a function of the at least one detected position of the key element as to which the user will probably use. In particular the use of one of the plurality of access elements is predicted if a probability of use is above a predetermined threshold value. In the subsequent step 14, the corresponding one of the plurality of access elements for which the use was predicted is moved from its closed position to its open position. For example, a vehicle door is opened for access to the motor vehicle. Subsequently, in step 16 it is then determined whether the prediction for use of the access element was incorrect. For example, an incorrect prediction has been made if the user wants to use or has used a different access element.

In subsequent step 18, the corresponding one of the plurality of access elements for which use was originally predicted is returned back from its open position to its closed position if the prediction for its use was incorrect. This allows the corresponding access element to be automatically closed again, thus avoiding inconvenient situations for the user due to incorrect use predictions of access elements.

If it is initially determined that the prediction was not incorrect, i.e. correct, step 16 can be repeated until the prediction is determined to be incorrect and it is continued with step 18, or until the prediction is determined to be finally correct, for example due to the user using the automatically opened access element. This repetition is illustrated by arrow 20 and can be intermittent, for example.

If the prediction was correct, for example due the user or carrier of the key element using the appropriate access and entering the vehicle, the method may be terminated. This is illustrated by step 22. For example, the prediction can be determined to be correct if the position detection of the key element shows that it has moved through the access element opened in step 14 into the interior of the motor vehicle.

Determining in step 16 whether the prediction was incorrect can also be done alternatively or additionally by a further prediction of which access element the user will likely use. This is illustrated by arrow 24. For the further prediction, therefore, the position of the key element is detected again (step 10) and the use of a respective access element is prediction predicted (step 12). If the result is different, that is, if the access element that is expected to be used changes, the previous prediction can be classified as incorrect. Accordingly, the previously opened access element is then closed again according to step 18. In addition, however, the other access element newly predicted for use can now also be opened according to step 14 and the method can continue with the determination according to step 16 as to whether the further prediction is incorrect.

In addition, a trigger signal can also be taken into account in step 16 to determine that the prediction was incorrect. Such a trigger signal could be, for example, a starting of a drive or engine of the motor vehicle, a start of movement of the motor vehicle, a manual operation of a lock and/or a detected movement of the key element through another access element into the interior of the motor vehicle.

Figure 2:
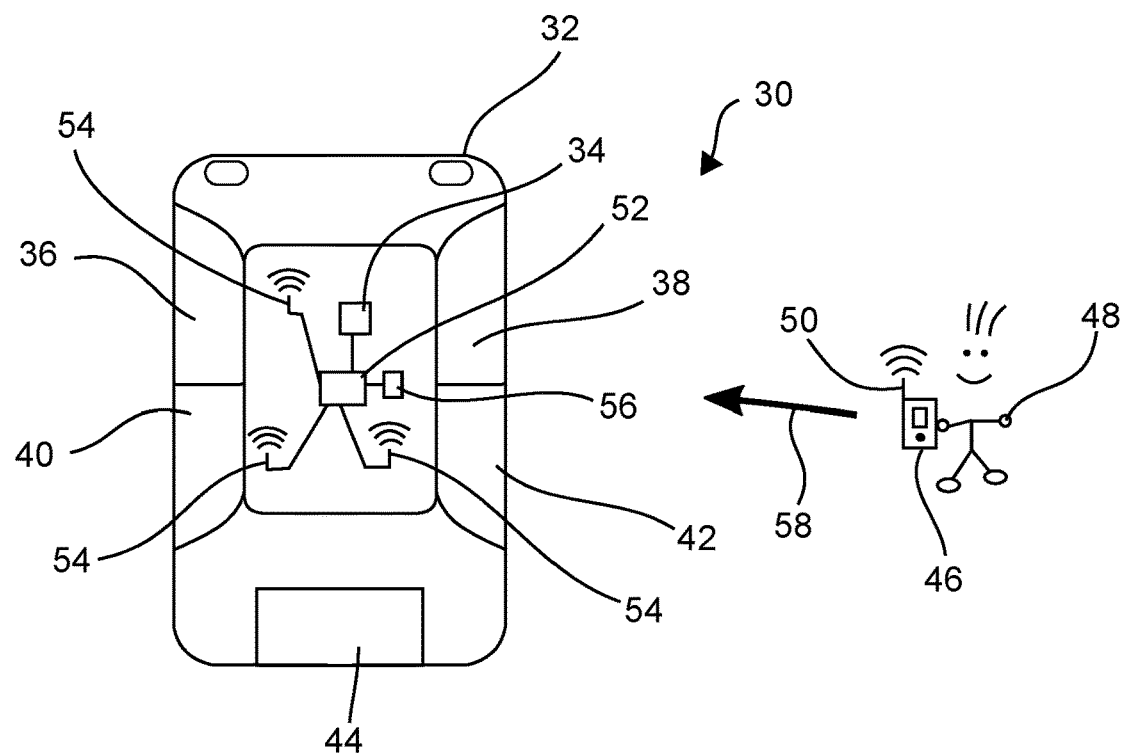
FIG. 2 shows in a schematic view an access control system for a motor vehicle.

FIG. 2 illustrates in a schematic view an access control system 30 for a motor vehicle 32. The access control system 30 comprises a movement device 34 for automatically moving a plurality of access elements of the vehicle. Here, the access elements are configured as the two front doors 36 and 38 or driver's door 36 and passenger door 38, as well as rear doors 40 and 42 and boot lid 44. These are each operatively connected to the movement device 34 for their opening and closing. Thus, the respective access elements of the motor vehicle 32 can be opened and closed automatically. The operative connection is not shown here and can be achieved, for example, by means of respective actuators.

The access control system 30 comprises one or more portable key elements. As an example of a key element, a smartphone 46 is shown here, which is carried by a user 48. The smartphone 46 has an antenna 50, which allows the transmission and/or reception of wireless transmission signals.

The access control system 30 also comprises a detection device 52, which is configured to detect by wireless transmission at least one position of the smartphone 46 relative to the motor vehicle 32. Here, the detection device 52 has three antennas 54 for this purpose, which are arranged at a distance from one another on the motor vehicle 32 and permit triangulation of the smartphone 46. Alternatively or additionally, sensor data acquired by the smartphone 46 could be used to detect the position relative to the motor vehicle 32. For example, the smartphone 46 could use acceleration sensors, position sensors and/or GPS to detect or calculate its position and/or movement and transmit this data by wireless transmission to the detection device 52.

The access control system 30 further comprises a prediction device 56, which is configured to predict, depending on the at least one detected position of the smartphone 46, which of the plurality of access elements 36, 38, 40, 42, 44 a carrier of the smartphone 46, i.e. the user 48, will probably use. In particular, the prediction device 56 can be configured to predict the use of one of the plurality of access elements 36, 38, 40, 42, 44 if a probability of use is above a predetermined threshold value. In addition, use can also only be predicted if the smartphone 46 or the user 48 has fallen below a predetermined minimum distance from the motor vehicle.

The movement device 34 is configured to move the one of the plurality of access elements 36, 38, 40, 42, 44 for which use has been predicted from its closed position to its open position. In the present case, the user 48 can, for example, approach the passenger door 38 in a straight line, as illustrated by arrow 56. The passenger door 38 is opened automatically as soon as the distance falls below a minimum distance, in order to allow user 48 to get in conveniently without any form of manual operation.

However, it could be the case that the user 48 walks past passenger door 38 and an engine hood because he wants to get in at driver's door 36. In this case, the prediction of use of the passenger door 38 was incorrect. The movement device 34 is configured to return the one of the plurality of access elements 36, 38, 40, 42, 44 for which the use was originally predicted, in this case the passenger door 38, from its open position back to its closed position in the event of an incorrect prediction. The passenger door 38 is thus automatically closed again if the prediction has been exposed to be incorrect, in order to spare the user 48 an uncomfortable manual closing.

The determination of whether a prediction was incorrect can, for example, be based on another prediction which now considers another access element to be most likely to be used. Accordingly, the determination can be made by the prediction device 56, for example. In the present case, therefore, it is predicted at some point in time that user 48 does not intend to use passenger door 38, but rather driver's door 36 for his access to motor vehicle 32. Accordingly, the passenger door 38 is automatically closed again. At the same time, the driver's door 36 can be opened automatically on the basis of the updated prediction in order to allow user 48 to enter the vehicle comfortably. If this prediction also turns out to be incorrect, driver's door 36 can also be closed again automatically.

As can be seen from the description of the access control system 30, it is suitable or configured to carry out the method illustrated in FIG. 1 or to be operated using this method.

REFERENCE SIGNS 10 step
12 step
14 step
16 step
18 step
20 arrow
22 step
24 arrow
30 access control system
32 motor vehicle
34 movement device
36 driver's door
38 passenger door
40 rear door
42 rear door
44 boot lid
46 smartphone
48 user
50 antenna
52 detection device
54 antenna
56 prediction device
58 arrow

The invention claimed is:

1. A method for access control of a motor vehicle, the motor vehicle having a plurality of access elements which each is automatically moveable between a closed position and an open position, the method comprising:
   detecting, by wireless transmission, at least one position of a key element carried by a user relative to the motor vehicle;
   predicting the one of the plurality of access elements which the user is likely to use depending on the at least one detected position of the key element;
   moving the corresponding one of the plurality of access elements for which the use has been predicted from its closed position to its open position;
   determining whether the prediction for the use of the access element was incorrect, wherein determining whether the prediction for the use of the one of plurality of access elements was incorrect is made in response to a trigger signal, wherein the trigger signal is a starting of an engine, an opening of another one of the plurality of access elements different than the one of the plurality of access elements for which the use has been predicted, a vehicle speed above a predetermined threshold, and/or an actuation of a lock of the motor vehicle; and
   returning the corresponding one of the plurality of access elements for which the use was originally predicted from its open position to its closed position if the prediction of the use was incorrect.

2. The method according to claim 1, wherein a plurality of successive positions of the key element is detected, wherein in predicting which one of the plurality of access elements the user is likely to use, the plurality of successive positions of the key element is taken into account, and/or wherein an environment of the motor vehicle is taken into account in predicting which one of the plurality of access elements the user intends to use.

3. The method according to claim 1, wherein a stored user behavior is taken into account in the prediction of the one of the plurality of access elements the user is likely to use.

4. The method according to claim 1, wherein determining whether the original prediction for the use of the one of the plurality of access elements was incorrect is made by making a subsequent prediction of which of the plurality of access elements the user is expected to use, and wherein the result of the subsequent prediction is different from the original prediction.

5. An access control system for a motor vehicle, comprising:
   a movement device for automatically moving a plurality of access elements of the motor vehicle between respective open positions and respective closed positions;
   at least one portable key element;
   a detection device configured to detect, by wireless transmission, at least one position of the portable key element relative to the motor vehicle;
   a prediction device, which is configured to predict, depending on the at least one detected position of the portable key element, which of the plurality of access elements that a carrier of the portable key element is likely to use, wherein the prediction device is configured to predict use of the one of the plurality of access elements if a probability of the use is above a predetermined threshold value; and
   a sensor device configured to determine whether the prediction was incorrect, wherein the sensor device is configured to determine whether the prediction was incorrect on a basis of detection of a trigger signal, wherein the trigger signal is a starting of an engine, an opening of another one of the plurality of access elements different than the one of the plurality of access elements for which the use has been predicted, a vehicle speed above a predetermined threshold, and/or an actuation of a lock of the motor vehicle,
   wherein the movement device is configured to move the one of the plurality of access elements for which the use has been predicted from the closed position to the open position, and
   wherein the movement device is configured to return the one of the plurality of access elements for which the use was originally predicted from the open position back to the closed position in case of an incorrect prediction.

6. The access control system according to claim 5, wherein the portable key element is configured as a wireless transmission key, smartphone, smartwatch, key card, RFID chip, and/or remote control.

7. The method according to claim 1, wherein the plurality of access element includes at least one of a door, a window, or a boot lid.

8. The access control system according to claim 5, wherein the at plurality of access elements includes at least one of a door, a window, or a boot lid.

9. The method according to claim 1, wherein the use of the one of the plurality of access elements is predicted if a probability of the use is above a predetermined threshold value.

\* \* \* \* \*